United States Patent
Brandmeier et al.

(10) Patent No.: US 12,296,760 B2
(45) Date of Patent: May 13, 2025

(54) SYSTEM FOR BRIDGING A GAP BETWEEN TWO ADJACENT COMPONENTS

(71) Applicant: Lisa Dräxlmaier GmbH, Vilsbiburg (DE)

(72) Inventors: Stefan Brandmeier, Vilsbiburg (DE); Marco Reis, Bodenkirchen (DE); Friedrich Graf, Eggenfelden (DE)

(73) Assignee: Lisa Draexlmaier GmbH, Vilsbiburg (DE)

( * ) Notice: Subject to any disclaimer, the term of this patent is extended or adjusted under 35 U.S.C. 154(b) by 212 days.

(21) Appl. No.: 17/586,817

(22) Filed: Jan. 28, 2022

(65) Prior Publication Data

US 2022/0258679 A1     Aug. 18, 2022

(30) Foreign Application Priority Data

Jan. 28, 2021 (DE) .......................... 102021101913.3

(51) Int. Cl.
*B60R 13/02*     (2006.01)
*B60J 5/04*     (2006.01)

(52) U.S. Cl.
CPC .......... *B60R 13/0243* (2013.01); *B60J 5/0468* (2013.01); *B60R 2013/0293* (2013.01)

(58) Field of Classification Search
CPC .............. B60R 13/0243; B60R 5/0468; B60R 2013/0293; F16J 15/025; F16J 15/3204; F16J 15/322; F16J 15/3232
See application file for complete search history.

(56) References Cited

FOREIGN PATENT DOCUMENTS

| | | | | |
|---|---|---|---|---|
| DE | 112006000956 | | 2/2008 | |
| DE | 102011101488 A1 | * | 11/2012 | ......... B60R 13/0206 |
| DE | 112017006308 | | 9/2019 | |
| KR | 100941431 B1 | * | 2/2010 | |

OTHER PUBLICATIONS

KR-100941431-B1 computer translation (Year: 2010).*
DE-102011101488-A1 computer translation (Year: 2012).*
DE112006000956 English Language Translation.
DE112017006308 English Language Translation.
DE102021101913 Office Action.

* cited by examiner

*Primary Examiner* — Lori Lyjak
(74) *Attorney, Agent, or Firm* — BelayIP

(57) ABSTRACT

A system for bridging a distance between two adjacent components is disclosed, the system including a first component and a second component arranged at a distance from the first component. The system further includes a bridging element arranged to bridge the distance between the first component and the second component. The bridging element may be elastic at least in certain regions and include a first region which is fastened to the first component. The bridging element further has a second region which has a first bearing surface extending towards the first component and a second bearing surface extending towards the second component. A thickness of the bridging element may be defined by the distance between the first contact surface and the second contact surface and selected such that the bridging element limits the distance to a minimum distance.

10 Claims, 3 Drawing Sheets

SYSTEM FOR BRIDGING A GAP BETWEEN TWO ADJACENT COMPONENTS

CROSS REFERENCE TO RELATED APPLICATIONS

This application claims priority to German Patent Application DE10202101913.3, filed Jan. 28, 2021, the content of which is herein incorporated by reference.

BACKGROUND OF THE INVENTION

Field of the Invention

The present invention relates to a system for bridging a distance between two adjacent components, the system comprising a first component and a second component disposed at a distance from the first component, and the system further comprising a bridging element disposed to bridge the distance between the first component and the second component.

Description of Related Art

Systems for bridging a gap between two adjacent components are known from the prior art. For example, in the case of a gap between a door trim and a door tube structure, it is known to fit hard, U-shaped profiles as a bridging element onto an integrally formed rib on the door trim. Such a system is shown in FIG. 1. However, the known system with a hard, i.e., inelastic, profile has the disadvantage that tolerances in the system cannot be compensated. In addition, high assembly forces are required and light-tightness between the door trim and the door tube structure cannot be guaranteed. Since light elements are often installed between the two components, the gap is thus unintentionally backlit, which additionally draws the attention of an observer to the gap.

In the state of the art, various approaches have been undertaken to circumvent the disadvantages described above. However, all of the currently known approaches lead to other disadvantages. For example, it is known to use an elastic bridging element, for example in the form of a sealing lip or a tubular profile, instead of a hard bridging element. Although this solves the disadvantages in terms of tolerance compensation, light tightness and high assembly force, it does have a disadvantage in terms of the gap size between the two components. The known elastic profiles require comparatively high tolerances to both directions in order to be able to exclude unintentional contact between the two components. If the tolerances are not maintained, an annoying contact noise can occur during driving if the components contact each other unintentionally. Therefore, a relatively large nominal gap with relatively high tolerances in both directions must be provided.

Since in automotive engineering the gap dimension serves as an important indicator of quality, it would be desirable to provide a system that eliminates the above-mentioned disadvantages without having to sacrifice a small gap dimension.

BRIEF SUMMARY OF THE INVENTION

Based on the above prior art, it is an object of the present invention to provide an improved system for bridging a distance between two components, which eliminates the above-mentioned problems and disadvantages of the prior art. In particular, it is an object of the present invention to provide a system which, on the one hand, is light-tight, has low assembly forces and a good tolerance compensation, and in which, on the other hand, only a small distance needs to be provided between the components.

A solution according to the present invention includes, in particular, providing a system for bridging a distance between two adjacent components, the system comprising a first component and a second component arranged at a distance from the first component, the system comprising a bridging element arranged for bridging the distance between the first component and the second component, the bridging element being formed elastically at least in some areas the bridging element having a first region which is fixed to the first component, characterized in that the bridging element has a second region which has a first abutment surface towards the first component and a second abutment surface towards the second component, a thickness of the bridging element defined by the distance between the first abutment surface and the second abutment surface being selected such that the bridging element limits the distance to a minimum distance.

The bridging element is preferably completely elastic. Particularly preferably, the bridging element is a rubber element, for example a rubber seal. The second region of the bridging element extends from the first component towards the second component. With a minimal gap between the two components, the first contact surface of the second region encounters the first component and the second contact surface of the second region comes into contact with the second component. The bridging element is thus arranged between the two components. The choice of the thickness of the bridging element can thus directly determine the minimum distance between the two components.

In addition to the thickness of the bridging element, the deformability of the bridging element can also be additionally selected in such a way that the bridging element limits the distance to a minimum distance. In particular, this takes into account that the bridging element cannot deform too much during operation, so that the specified thickness of the bridging element is sufficient to keep the two components at a distance during operation.

According to an advantageous further development of the present invention, it is provided that the minimum distance is in a range between 0.2 mm and 0.6 mm.

This allows and/or provides for a small gap to be formed between the two components, which is nevertheless sufficient to keep the two components sufficiently spaced apart. Preferably, the minimum gap is in a range between 0.3 mm and 0.5 mm, particularly preferably the minimum gap is about 0.4 mm.

The system has tolerances. Thus, the distance between the two components is specified accordingly with a maximum dimension and a minimum dimension. For example, it would be conceivable that the distance between the two components is specified by means of a nominal gap N and corresponding tolerances as follows: N+0.8 mm/−0.2 mm. If the nominal gap N is preferably 0.6 mm, then a distance between 0.4 mm and 1.4 mm is within the tolerance. The minimum gap is then the above-mentioned 0.4 mm and the maximum gap is 1.4 mm. On the one hand, this ensures that the components do not contact each other, and on the other hand that the gap is small enough to meet the quality requirements for the gap dimension.

Due to the arrangement and thickness of the bridging element according to the present invention, it is advantageously possible to keep the distance to the minimum dimension very small at 0.2 mm. This allows the necessary tolerances to be reduced accordingly, so that the nominal gap can be selected to be small. In comparison, a significantly higher dimension to the minimum dimension would have to be selected for a conventional system: N+0.8 mm/−0.8 mm. Here, the nominal gap N would have to be 1.2 mm to ensure a minimum clearance of 0.4 mm. Then the gap is thus between 0.4 mm and 2 mm.

Particularly and preferably, the bridging element is pre-tensioned to the first component in such a way that the second contact surface comes into contact with the second component.

In other words, the second contact surface is pressed against the second component in the assembled state of the bridging element. In this way, it can be ensured that the gap is at least substantially tightly sealed. Preferably, the gap is at least substantially fluid-tightly sealed, but at least the gap is at least substantially light-tightly sealed. This can prevent light from light elements between the two components from shining through the gap to the outside.

It is preferred that, in order to limit the minimum distance, the second contact surface comes into contact with the second component and the first contact surface comes into contact with the first component.

The fact that the bridging element comes into contact with the two components can prevent them from moving further towards each other. The desired minimum distance can thus be set by means of an appropriate selection of the thickness and optionally the deformability of the bridging element.

Preferably, it can be provided that the first component has an abutment recess which is designed to come into contact with the first abutment surface and to receive the second region at least in regions.

More specifically, a bottom of the contact recess comes into contact with the first contact surface when the distance between the first component and the second component is minimal.

This makes it possible to make the minimum distance between the first component and the second component smaller than the thickness of the bridging element. In other words, it can thus be avoided that the second area of the bridging element is provided at the narrowest point between the first component and the second component. It is thus possible, despite an optically small minimum distance, to select a bridging element at the narrowest point between the first component and the second component, which has a sufficient thickness so as to be stable and to be able to fulfill its function in limiting the minimum distance.

According to an advantageous further development of the invention, it is provided that the contact recess has a length in a direction perpendicular to the distance, the length being between 1 mm and 3 mm long.

Preferably, the length is between 1.2 mm and 2 mm long, and particularly preferably the length is about 1.7 mm long. The length is thus in an optimum range to ensure a good function of the bridging element. The length of the contact recess also has a corresponding effect on the contact area between the bridging element and the first component. The larger the contact area, the more force the bridging element can absorb. It is also conceivable to limit the deformation of the bridging element with a corresponding choice of the length of the contact recess and the length of the bridging element. The bridging element can then only deform until it abuts the wall of the contact recess that limits the length of the contact recess.

Preferably, it may be provided that the first component includes a mounting rib to which the first portion of the bridging element is attached.

The rib may preferably be integrally formed, for example molded, on the first component. The fastening rib further preferably extends at least substantially in the direction of the second component, i.e. parallel to the distance dimension. Alternatively, the first component may have a recess in which the first region of the bridging element is secured.

Particularly preferably, it can be provided that the first area of the bridging element is designed to be plugged onto the fastening rib.

This means that the bridging element can be quickly and easily attached to the fastening rib. For example, the bridging element can be a clip. In the alternative with recess, the first area of the bridging element is then inserted into the recess.

Preferably, it can be provided that the bridging element comprises a guide body extending in the direction of the second component.

The guide body serves to facilitate assembly. The guide body preferably extends at least substantially in the direction of the spacing dimension. The assembly can be carried out by means of an assembly roller, which is arranged between the bridging element and the second component and presses the bridging element onto the fastening rib of the first component. If the bridging element has a guide body and the mounting roller has a complementary guide recess, the assembly process can be simplified, and a good assembly result can be achieved. By way of example, the guide body is a portion projecting in the direction of the first component, in particular a guide rib. Accordingly, the assembly roller has a circumferential guide groove which is designed to receive the guide rib at least in certain areas during assembly and thus to guide the assembly roller.

According to an advantageous further embodiment of the invention, it is provided that the first component is a door panel, and the second component is a door tube structure of a vehicle.

The system may therefore be a system in and/or for a vehicle. In the automotive sector, particularly high demands are placed on the coordination of installed components. The gap dimension is seen here as a quality feature. In particular, the bridging element can be formed at least substantially circumferentially on the door trim.

BRIEF DESCRIPTION OF THE SEVERAL VIEWS OF THE DRAWINGS

Further features, advantages and embodiments of the present invention will be apparent from the following description of embodiments of a system for bridging a distance between two adjacent components as well as from the supporting figures, wherein.

DETAILED DESCRIPTION OF THE INVENTION

Figure 1:
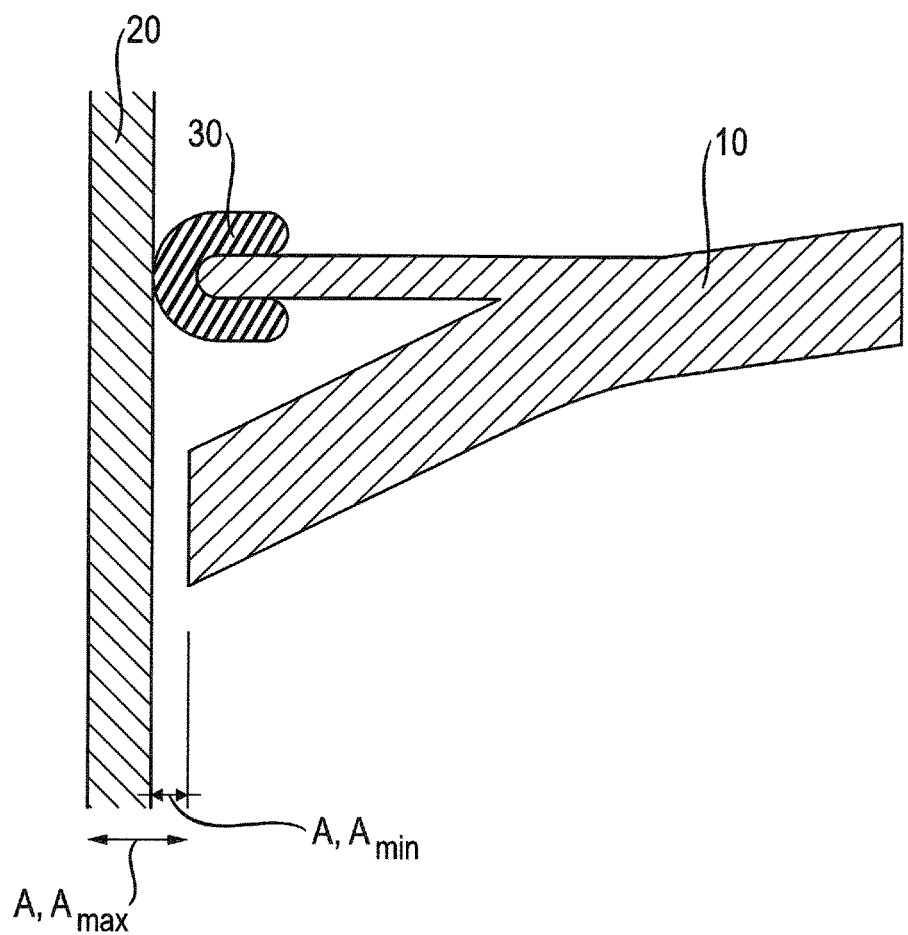
FIG. 1 depicts a schematic representation of a bridging element from the prior art.

FIG. 1 depicts a schematic representation of a bridging element 30 of the prior art. The bridging element 30 is arranged for bridging a distance A between a first component 10 and a second component 20. The bridging element 30 is a hard, U-shaped profile that is fitted onto an integrally formed rib on the component 10. The first component 10 is, for example, a door panel and the second component is, for example, a door tube assembly. It can be seen that the system illustrated in FIG. 1 is not suitable for compensating for tolerances. When the distance A, as shown as $A_{min}$, is minimal, the bridging element 30 comes into contact with the first component 10 and the second component 20. If the distance A is greater, as $_{max}$ represented for example by the maximum distance A, a large gap is created between the bridging element 30 and the second component 20. Accordingly, the system is then no longer light-tight. In addition, high assembly forces are required due to the hard profile.

Figure 2:
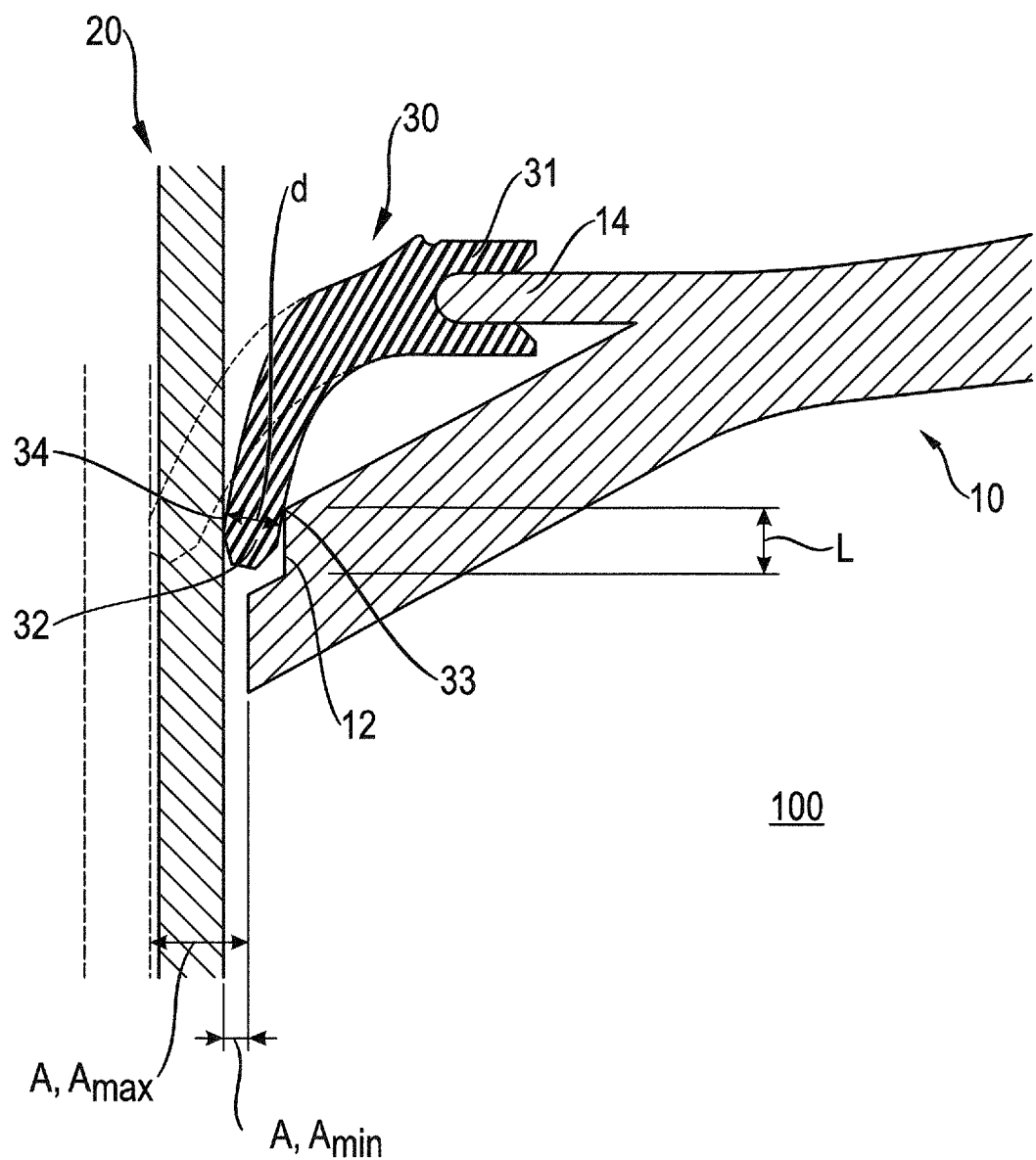
FIG. 2 depicts a schematic representation of a first embodiment of a system according to the invention for bridging a distance between two adjacent components.

FIG. 2 depicts a first embodiment of a system 100 according to the invention for bridging the distance A between two adjacent components 10 and 20. The components 10 and 20 may again be, for example, a door panel and a door tube assembly.

A distance A is formed between the first component 10 and the second component 20, the distance A being measured at a position where a gap between the two components 10 and 20 is at its smallest. Here, this is a lower portion of the first component 10 that extends obliquely downward toward the second component 20.

The system 100 comprises a bridging element 30 according to the present invention. The bridging element 30 comprises a first portion 31 attached to a mounting rib 14 of the first component 10. In particular, the first portion 31 is plugged onto the fastening rib 14. Alternatively to the fastening rib 14, a recess can also be provided into which the first area 31 can be plugged. The first area 31 is then preferably at least substantially pin-shaped. The bridging element 30 extends from the first region 31 in the direction of the second component 20, with the bridging element 30 being bent downwards. More precisely, the bridging element 30 is bent in the direction of the lower region of the first component 10.

The bridging element 30 has a second region 32. The second region 32 is formed at an end of the bridging element 30 opposite the first region 31. The second region 32 has a first abutment surface 33 toward the first component 10 and a second abutment surface 34 toward the second component 20. A thickness d of the bridging element 30 is drawn as a distance between the first abutment surface 33 and the second abutment surface 34.

In FIG. 2, the component 10 and the component 20 are shown once with a minimum distance A$and_{min}$ once with a maximum$_{max}$ distance Ad. The second component 20 is shown twice for this purpose. To show the minimum distance $A_{min}$, the component 20 is shown with a solid line, and to show the maximum distance $A_{max}$, the component 20 is shown with a dashed line further to the left. Similarly, the bridging element 30 is shown with a solid line to represent its position at a minimum distance $A_{min}$ and is shown with a dashed line to represent its position at maximum distance $A_{max}$. As would be appreciated, there are a variety of other distances between these two limits.

As can be seen in FIG. 2, when the minimum distance $A_{min}$ is present, the second contact surface 34 comes into contact with the second component 20 and the first contact surface 33 comes into contact with the first component 10. The thickness d of the bridging element 30 in the second area 32 can thus be used$_{min}$ to control or limit the minimum distance A.

When the maximum gap $A_{max}$ is present, the second area 32 is also pressed in the direction of the second component 20 due to the bias of the bridging element 30, so that the second contact surface 34 is in contact with the second area 32. As a result, the system 100 is light-tight even with a maximum gap between the two components 10, 20. However, as can be seen from the dashed illustration of the bridging element 30, when the maximum gap $A_{max}$ is present, the first component 10 is not in contact with the first contact surface 33.

The first component 10 has an abutment recess 12 with a length L, which is designed to come into contact with the first abutment surface 33 and to receive the second region 32 at least in regions. In particular, the contact recess 12 comes into contact with the first contact surface 33 when the minimum distance $A_{min}$ is present. The contact recess 12 is located at the lower region of the first component 10, which extends obliquely downwards towards the second component 20. More precisely, the abutment recess 12 is located at an upper portion of the lower region, with the smallest gap between the components 10 and 20 being formed at a lower portion of the lower region.

Figure 3:
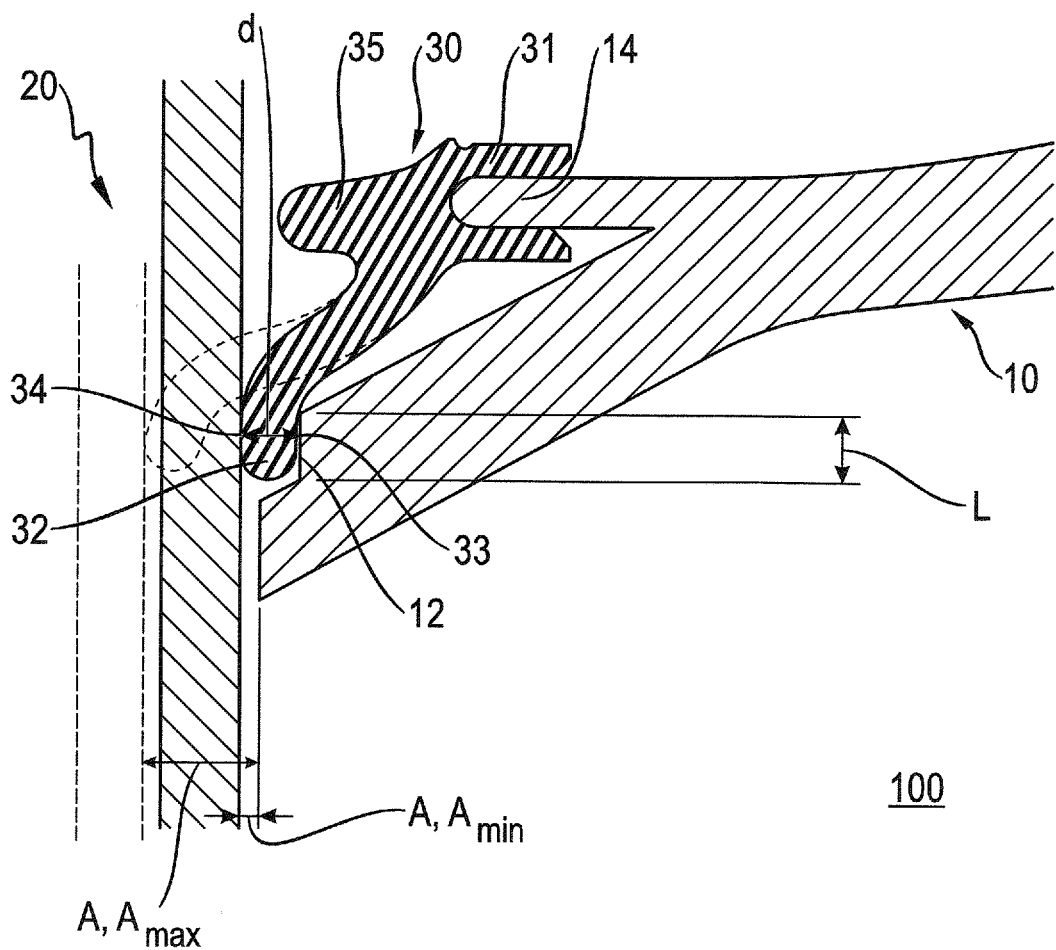
FIG. 3 depicts a schematic representation of a second embodiment of a system according to the invention for bridging a distance between two adjacent components.

FIG. 3 is a schematic representation of a second embodiment of the system 100 according to the present invention for bridging the distance A between the components 10 and 20. The system 100 according to the invention in FIG. 3 essentially corresponds to the system 100 shown in FIG. 2. Therefore, only the differences will be discussed below.

The bridging element 30 shown in FIG. 3 additionally has a guide body 35. The guide body 35 is designed as a rib and extends at least substantially parallel to the fastening rib 14 in the direction of the second component 20. This can simplify the assembly of the bridging element 30 particularly well. The assembly of the bridging element 30 is carried out by means of a tool, for example by means of an assembly roller. The assembly roller is arranged between the bridging element 30 and the second component 20 for assembly and is then rolled along the transition between the two components, pressing the bridging element 30 onto the fastening rib 14 of the first component 10.

The assembly roller can be guided by the guide body 35, thus simplifying the assembly process. For this purpose, the assembly roller has a circumferential guide groove, the size and shape of which is designed to accommodate the guide body 35 for guiding.

It should be noted that the features of the present invention described with reference to individual embodiments or variants, such as the type and design of the individual components and their precise dimensioning and spatial arrangement, can also be present in other embodiments, except where otherwise indicated or where this is self-evident for technical reasons. Moreover, of such features of individual embodiments described in combination, not necessarily all features must always be realized in a respective embodiment.

What is claimed is:

1. A system for bridging a distance between two adjacent components, the system comprising:
    a first component and a second component wherein the first component comprises a mounting rib, and the first component and the second component are arranged at the distance from each other,
    a bridging element configured and arranged to bridge the distance between the first component and the second component in a light-tight arrangement, the bridging element configured to be elastic at least in certain locations, the bridging element comprising a first abutment surface; and a second abutment surface, and wherein the first abutment surface is facing the first component and a second abutment surface is facing the second component and is in contact with the second component, wherein a thickness of the bridging element defined by the distance between the first abutment surface and the second abutment surface is such that the bridging element limits the distance between the first component and the second component to a minimum distance and forms the light-tight arrangement, and wherein the bridging element further comprises a first region defining a cavity configured to receive at least a portion of the rib entirely therein within the cavity and a second region comprising the first abutment surface and the second abutment surface.

2. The system according to claim 1, wherein the minimum distance is in a range between 0.2 mm and 0.6 mm.

3. The system according to claim 1, wherein the first component further comprises an abutment recess.

4. The system according to claim 3, wherein the abutment recess further comprises a length extending in a direction perpendicular to the distance, the length being between 1 mm and 3 mm in length.

5. The system according to claim 1, wherein the mounting rib comprises a first end and second end, the first end configured to attach to the first component and the second end configured to be accommodated withing the cavity.

6. The system according to claim 1, wherein the first component is a door panel and the second component is a door tube structure of a vehicle.

7. The system according to claim 1, wherein the bridging element is configured to flex away from the first component so as to make contact with the second component.

8. The system according to claim 3, wherein the bridging element further comprises a second region and the abutment recess is configured to receive at least a portion of the second region therein.

9. The system according to claim 8, wherein the second region comprises the first abutment surface and the second abutment surface, the first abutment surface and the second abutment surface configured and arranged such that the first abutment surface contacts the abutment recess while the second abutment surface contacts the second component.

10. The system according to claim 1, wherein bridging element further comprises a guide body extending in the direction of the second component.

* * * * *